US007970489B2

(12) United States Patent
Witczak

(10) Patent No.: US 7,970,489 B2
(45) Date of Patent: Jun. 28, 2011

(54) METHOD AND DEVICE FOR THE MANAGEMENT OF OBJECTS

(75) Inventor: John Witczak, Koekelberg (BE)

(73) Assignee: Beldico Integrated Solutions, S.A., Marche-En-Famenne (BE)

( * ) Notice: Subject to any disclaimer, the term of this patent is extended or adjusted under 35 U.S.C. 154(b) by 782 days.

(21) Appl. No.: 11/938,850

(22) Filed: Nov. 13, 2007

(65) Prior Publication Data

US 2008/0128452 A1 Jun. 5, 2008

(30) Foreign Application Priority Data

Nov. 14, 2006 (EP) .................................... 06447120

(51) Int. Cl.

*G06F 17/00* (2006.01)
*A47B 95/02* (2006.01)
*E05B 9/10* (2006.01)
*G07F 11/00* (2006.01)

(52) U.S. Cl. ........ 700/218; 700/231; 700/232; 700/234; 700/237; 700/244; 312/348.3; 312/215; 221/4

(58) Field of Classification Search ........................ None
See application file for complete search history.

(56) References Cited

FOREIGN PATENT DOCUMENTS

| | | |
|---|---|---|
| JP | 10151179 | 6/1998 |
| WO | 99/30248 | 6/1999 |
| WO | 2004/014189 | 2/2004 |
| WO | WO 2004014189 A1 * | 2/2004 |

* cited by examiner

*Primary Examiner* — Gene Crawford
*Assistant Examiner* — Yolanda Cumbess
(74) *Attorney, Agent, or Firm* — Cozen O'Connor

(57) ABSTRACT

The invention relates to a method for the automated monitoring and the management of objects, especially medications in hospital environments, wherein this method consists, from a network of n individual housings containing a set of n objects, of transmitting to at least one of these objects, one or more movements selected from the extractions of said object from its housing and re-introductions of this object into an empty housing amongst the n housings, of automatically detecting the movement made and of using this detection in computer processes.

This method is characterized in that a movement introducing an object into an empty housing or withdrawing an object from a housing, wherein this housing is formed by a spring system comprising two blades attached to a support block, is detected:

- during an introduction of an object in said housing, by transforming the force required to separate the two blades into a force perpendicular to the pressure sensor which results in a pressure on this sensor and a contact with it, which generates an item of movement information,
- during a withdrawal of an object from said housing, by causing the two blades to move towards one another and consequently the breaking of a pre-established contact with the pressure sensor, which generates an item of movement information.

10 Claims, 3 Drawing Sheets

METHOD AND DEVICE FOR THE MANAGEMENT OF OBJECTS

FIELD OF THE INVENTION

This invention relates generally to a method for the management of objects as well as to a device for its implementation.

More precisely, the invention relates to a method for the automated monitoring and the management of objects, especially medications in hospital environments, wherein this method consists, from a network of n individual housings containing a set of n objects, of transmitting to at least one of these objects, one or more movements selected from the extractions of said object from its housing and re-introductions of this object into an empty housing amongst the n housings, of automatically and instantaneously detecting, by means of a pressure sensor, the movement made and of using this detection using computer processes.

BACKGROUND OF THE INVENTION

At present, there are, in hospital environments, no computer systems which permit the complete management of medications, as such a system is not on sale. For this reason, such management is carried out at least partially in a manual fashion.

As the nursing staff may have access to all types of medications so that they may be administered, it is virtually impossible to identify accurately the nature and the quantity of each medication administered to a patient so that they may be invoiced to the latter. This situation is even truer and worrying in emergency situations, as in ordinary situations, it may be imagined that the nursing staff has the possibility of recording on a sheet the medications administered to a patient which constitutes, in all cases, a loss of time.

Furthermore, the supply of the local pharmacies, which is to say the pharmacies located in each hospital department, is generally made at regular intervals, for example, every day or every two days following a check made in these pharmacies where the missing medications are listed, noted and ordered from the central pharmacy of the hospital. Consequently, a member of the nursing staff may be required, in certain cases, to make an unnecessary trip, as no top up supply is required upon checking.

The management of narcotics and anaesthetic products deserves particular attention. In fact, these medications constitute a class for which the control of the movements via the local pharmacies must be organized scrupulously. However, these checks are often too limited or so complex that they cause losses of time.

As concerns the invoicing of the medications to the patients, in most cases this is based on the prescriptions made by the doctors and the notes of the nursing staff. Consequently, it is not always possible to identify accurately the medications actually administered so that these medications are invoiced to the patient, more on the basis of the type of pathology treated than the actual supply of medications.

It therefore appears most important to be able to make use of a system for managing the medications in hospital environments that is either entirely automated thus excluding any manual interventions, especially for the invoicing of these medications to the patients. Ideally, this system would provide the automation not only to monitor the stock of medications in the local pharmacies but also the recording of the withdrawal of medications from these pharmacies destined for a patient, authorizing limited access to secured medications such as narcotics as well as recording the invoices concerning the medications in the invoicing device of the hospital.

SUMMARY OF THE INVENTION

Consequently, this invention overcomes the disadvantages of the state of the art by proposing a method of monitoring and managing automatically that is simple to implement, rational and flexible especially for the automatic management and monitoring of medications in hospital environments, especially as concerns the invoicing of the medications actually administered to a patient.

To achieve this objective, the method of the type previously mentioned is characterised in that a movement which introduces an object into an empty housing or withdraws an object from a housing, wherein this housing is formed by a spring system comprising two blades attached to a support block, is detected:

when an object is introduced into said housing, by transforming the force required to separate the two blades into a force perpendicular to the pressure sensor which results in a pressure being exerted on this sensor and a contact being made with it, which generates an item of movement information, when an object is withdrawn from said housing, causing the two blades to move together and consequently the rupture of a pre-established contact with the pressure sensor, which generates an item of movement information.

The above method may find applications in different fields where there is an obligation of automatically registering the movements of objects from a stock of such objects so that the stock may be managed. However, in certain applications, it is necessary in addition to identifying the individual who has made this movement of objects and/or the name of the person or entity in whose name this movement has been made.

This necessity appears primordial in hospital environments where the handling of certain potentially dangerous products such as narcotics must only be authorised to certain members of the hospital staff.

Consequently, the method of the invention permits especially, by the use of appropriate computer processes using the movement detection in question, to achieve the monitoring and management of a stock of objects in particular the monitoring of the stock of medications in the various pharmacies located in the hospital, the recording of the medications administered to a patient so that for example they may be automatically invoiced to the latter or even the recording of the members of the hospital staff, doctors or nurses, who have made given movements of medications.

Consequently, in another of its aspects, the method of the invention is characterised in that the step of the transmission of movements to the objects is preceded by the following series of steps which consists of:

- creating and storing, in the memory of a computer processing unit, data that is specific to a set of objects and/or individuals,
- composing a network of n individual housings for the set of said objects,
- placing in the n housings one of said objects per housing so that the network contains a number equal to n objects,
- transmitting to the computer processing unit a memorized item of information to identify a memorized individual.

Furthermore, in one specific aspect, the method of the invention is characterised in that the step of the transmission of movements is followed by a transmission step, to the computer processing unit, of the identification information of this movement which takes into account in the memorized data of the individual respectively the addition or the withdrawal of the object.

In another of its aspects, the invention relates to a device for the use of the method of the above invention, device which comprises:

a network of n individual housings capable of accommodating a set of n objects, wherein each housing is equipped with means of automatically detecting movements of the object initially located in one of the n housings, wherein the detection means comprise a pressure sensor and these movements are selected from the extractions of said object from its housing and the re-introductions of this object into an empty housing among the n housings of the network, means capable of transforming this detection of movement into an item of information for identifying this movement shown by a withdrawal or a re-introduction, as well as means capable of accepting this information identifying the movement and of using it in a computer processing unit, wherein this device is characterised in that the movement detection means also comprise a spring system equipped with two blades capable of moving apart when an object is introduced between them and moving towards one another when an object inserted between them is withdrawn.

In particular, the device for the implementation of the method of the invention is characterised in that it comprises a central computer data processing unit comprising a stored data base comprising a stored data base specific to a set of n objects and/or individuals, as well as means capable of transmitting the movement identification information to the data processing unit and of recording and memorizing it in the data base of objects and/or individuals.

The above device for the management of objects is essentially based on automatic detection means, electronic and instantaneous of the movements of objects with respect to a housing containing or capable of containing this object, wherein this system is managed by computer software.

These detection means may advantageously be used to record the withdrawals of pharmaceutical products from the housings in which they are initially placed or, depending on the requirements, to record the re-introductions of these products into the housings initially designed to contain them.

In this way, in another of its aspects, the device of the invention is characterised in that the spring system comprises two symmetrical blades each formed by an upper wing and a lower wing articulated between one another and forming at rest an obtuse angle, wherein these blades are positioned back to back at their articulation and in that these upper wings are configured to form together a housing for the object and in that the lower wings are connected to one other by a wire forming a spring which cooperates with a push button capable of moving perpendicularly to the pressure sensor until it comes into contact with it or is freed from it.

Advantageously, each of the detection means that are part of the network of n housings comprises a spring system, usually located in a support block, and a pressure sensor. This spring system, which essentially composes the housing that accommodates or is designed to accommodate the object, permits the force required for the insertion of this object into this housing to be transformed into a force perpendicular to a pressure sensor and, at the same time, into a pressure on the latter. This pressure is furthermore independent of the dimensions of the object housed or to be housed especially of its diameter if it is a cylindrical object.

In one specific and preferred embodiment, this spring system itself comprises two symmetrical blades usually made by moulding a thermoplastic material such as a polyamide. These blades are each formed by two wings, an upper wing and a lower wing articulated between one another and each forming at rest an obtuse angle. Furthermore, these blades are positioned back to back at their articulation so that the obtuse angles in question are opposed at their tops. Usually, the two upper wings are configured to form together the housing designed to accommodate the object whereas the lower wings are connected to one another by a wire forming a spring which cooperates with a push button capable of moving vertically, which is to say perpendicularly to a sensor, until it comes into contact with it or is freed from it.

The spring system thus formed is attached to a support that is usually a support block in which it is located so that it may be attached, preferably so that it may be removed.

Generally, this block is formed by four longitudinal walls united by their longitudinal edges thus defining a volume lacking transversal walls at the base and top. In this volume is located a tubular portion parallel to these walls and featuring at least one longitudinal groove, and generally two grooves. This tubular portion is attached to the walls by means of rigid arms such that these grooves may cooperate by sliding with longitudinal protrusions equipping the outside wall of the push button. Moreover, the opposite upper edges of two of these transversal walls are configured so that they participate in the attachment of the spring system inside this volume. This attachment is made advantageously by means of the upper wings of this system and more especially by their upper edges so that the distance between these upper wings remains constant whether an object is present or not in the housing they form.

Usually, these wings are attached to the walls in question by conventional means, for example by means of tenons. These tenons, extending from the two upper edges of the upper wings, cooperate with orifices located in two opposite walls of the support block or, preferably, with slots made in the edges of these two opposite walls.

Furthermore, the support of the spring system, advantageously the support block, is itself attached to a support plate of the pressure sensor such that the latter is positioned in the extension of the displacement of the push button.

This attachment, that may preferably be removed, may be made by all appropriate known means especially using hooks on the lower edges of the support block, wherein the hooks cooperate, by insertion, with the orifices in the support plate of the pressure sensor.

This pressure sensor advantageously corresponds to a device that converts pressure, weight and force into an electrical resistance that can be measured. The value of this resistance, as well as its sensitivity, may be adapted, according to the requirements, by modifying the topology of the sensor and by selecting the materials suited to the specific application envisaged. Moreover, this sensor may be used in extreme conditions or specific circumstances, for example in the presence of a pressure and/or a low temperature or on the contrary high temperature or mounted on difficult surfaces.

The spring system, of which one portion forms the housing designed for the object, the support block and the pressure sensor associated together form the automatic detection means of objects.

The network of n housings, which is part of the device for the use of the method of the invention comprises, consequently, n means of automatic detection positioned for example:

in juxtaposition to one another to form a compact set, or in sub-groups or modules juxtaposed next to one another, wherein each module is formed by at least two of the detection means in question of which the adjacent walls are juxtaposed or merged with one another, or in one or several modules as previously described completed by one or several of the detection means in question completely isolated, or completely isolated.

In one of the specific embodiments previously mentioned, two adjacent walls of two support blocks of the means of detection may be juxtaposed or even merged into a single wall common to these two support blocks. In such a configuration, the support plates of the pressure sensors of the means of detection concerned are united in juxtaposition by their adjacent edges.

Similarly, the support plates of two means of detection of which two adjacent walls are merged are themselves merged by their adjacent edges. Consequently, in one advantageous embodiment, the different support plates of the n pressure sensors of a network are, after juxtaposition with one another, merged by their adjacent edges into a single support plate.

Usually, the set of the pressure sensors of the network of n housings is managed by an electronic board that carries out the intermittent or, preferably, permanent scanning of these sensors. This scanning may thus permit the nature of any movements transmitted to the different objects in the network of housings to be detected, which is to say an introduction into an empty housing, translating the presence of an object in this housing, detected by the contact with this pressure sensor and the extraction from a housing, translating the absence of an object in this housing, detected by the liberation of a contact with this pressure sensor. This detection then generates an item of movement information that is transmitted to the central computer processing unit so that it may be used according to requirements.

The automatic detection device previously described may be used to detect the movements of an object compatible with the dimensions of the housing designed to accommodate it. Furthermore, this object will have a solid consistency and be sufficiently rigid to cause, when it is introduced into this housing or removed from it, respectively a pressure on the upper wings of the spring system or a release of this pressure.

Different objects which satisfy these criteria may be envisaged, in particular, and non restrictively, bottles, flasks, tubes, cans or similar, which are made for example from glass, metal, rigid plastics, rigid cardboard or similar and containing and liquids such as drinks, cosmetic products, cleaning agents, cleaning products, phytosanitary or other products.

In one specific and preferred embodiment, the objects that are to be managed, according to the method and device of the invention, are represented by medications, which is to say pharmaceutical and/or veterinary products, possibly packaged or even by medical or surgical devices or appliances if required that are packaged.

Consequently, these medications and these medical or surgical devices or appliances, packaged or not, will be designated hereunder by, in general, by “medical or surgical products”.

The medications in question may be presented in all pharmaceutical forms—solid, flexible, semi-solid, liquid or even in the form of pressurised pharmaceutical preparations.

By way of non restrictive examples, these various pharmaceutical forms may be chosen from sachets, tablets, soft capsules, coated pills, capsules, chewing gums, granules, pills, oral powders, powders to be injected, suppositories, pessaries, transdermal devices, cataplasms, creams, plasters, gels, pastes, ointments, eye lotions, drinkable emulsions, optic drops, lotions, foams, shampoos, syrups, solution to be drunk or injected, drinkable suspensions, oral liquids, preparations for inhalation with nebulizers, pressurised or powder inhalers.

Given their consistency, dimensions or weight that are not suited for use according to the invention, most of the galenical forms mentioned above will be placed in a container that satisfies the solidity and rigidity criteria mentioned previously, for example a tube, that is preferably cylindrical.

In such an application of the invention, an application designed especially for hospital environments, the means of electronic and automatic detection of the movements of medical or surgical products, hereunder also called “EDD means” (electronic detection of drugs) and the computer software related to their use form a group of elements completed by an item of specific equipment integrating these elements comprising:

a central computer data processing unit comprising a base of memorized data specific to a set of n medical or surgical products, usually the medications, and/or individuals represented essentially by the members of the hospital medical staff, especially the doctors and nurses, at least one interactive trolley equipped with EDD means located in networks in one or several drawers of this trolley, at least one storage cabinet for medical or surgical products equipped with EDD means located in networks in one or several drawers of this cabinet, at least one terminal interactive operating as a communication terminal and controls for the central computer processing unit and the cabinets.

The different elements of the group previously mentioned are interconnected according to the autonomous sub-groups of constituents, usually two such sub-groups, which is to say a “cabinet sub-group” composed of an interactive terminal and at least a fixed cabinet such as that previously described and a “trolley sub-group” composed of a single mobile trolley as previously described.

Each sub-group is connected to the central computer unit by means of a network, preferably wireless for example of the Wi-Fi type.

BRIEF DESCRIPTION OF THE DRAWINGS

The invention will be better understood and other objectives, characteristics and advantages of it will become clearer in the following detailed description made in reference to the appended drawings provided solely by way of example illustrating different embodiments of the invention and in which.

DETAILED DESCRIPTION OF THE DRAWINGS

Figure 1:
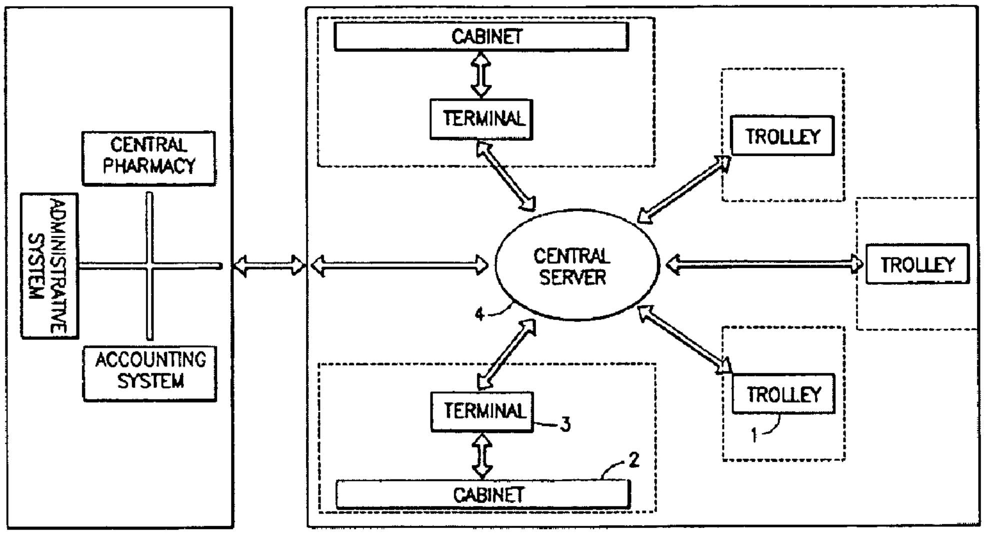
FIG. 1 is a diagrammatical representation of a device for the implementation of the medication management method according to the invention.

As shown in FIG. 1, the device implementation of the method according to the invention designed to manage medications in hospital environments comprises interactive trolleys 1 integrating one or several drawers equipped with automatic means of detection, or EDD means for the detection of medications, cabinets 2 equipped with drawers containing EDD means, interactive terminals 3 as well as a central computer processing unit 4 (central server).

The different elements of this group are interconnected in sub-groups, which is to say three "trolley sub-groups" each comprising a trolley 1 and two "cabinet sub-groups" each comprising cabinets 2 and a terminal 3.

Generally, the trolleys and terminals are connected to the central server by Wi-Fi type networks based on the TCP/IP protocol, whereas the terminals are connected to the cabinets by means of RS 485 networks usually based on an internal protocol of the hospital.

The device according to the invention thus designed is then also connected via a Wi-Fi network to different entities of the hospital, in general to its central pharmacy, its administrative system and to its accounting system.

Trolley and Movement Detection Means

Figure 2:
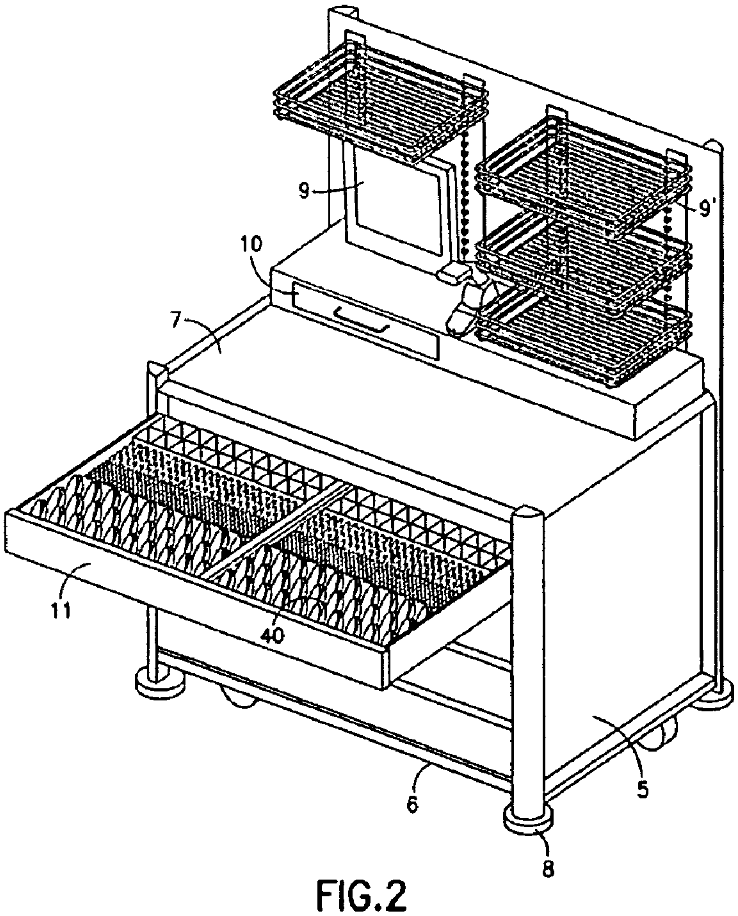
FIG. 2 is a representation in perspective of a trolley of the device of FIG. 1, FIGS. 3 and 4 are representations in perspective of a modular support block.

The trolley 1, which can be seen in FIG. 2, comprises lateral walls 5, a transversal wall 6 forming a base and a transversal wall 7 defining a work surface. These walls are usually metallic, made for example from aluminium or stainless steel.

The assembly thus constituted is attached to means which provide its mobility, which is to say castors 8 that may be removed to make this trolley stationary.

Furthermore, the trolley in question is also equipped, inside, with a computer processing unit (not shown) equipped with memory elements, generally a personal computer connected to different peripheral devices. The latter comprise in particular a screen 9, preferably touch sensitive where all of the functions are accessible by simply pressing it, a keyboard with a pointer system integrated into a drawer 10, a bar code reader (not shown) permitting either to identify an individual such as a patient or a member of the hospital staff or to carry out the scanning of a medication so that for example it may be invoiced to a patient, a printer (not shown) designed for example to print identification labels for medicinal preparations and an electronic board (not shown) capable of providing the central management of the trolley. FIG. 2 also shows via the neighboring screen 9 with a series of shelves 9' for the storage of various products or objects.

Incidentally, this trolley may be equipped with a mouse designed to be used by the operator, a port designed to upload or download data from another computer processing unit or even a modem for the uploading/downloading of data from another computer processing unit via a telephone connection or a wireless connection for example of the Wi-Fi type.

It may also be mentioned that this trolley is autonomous as it is equipped with its own electrical power supply which allows it to operate when it is moved. Furthermore, its infrastructure allows it to be fully progressive and suitable for applications for example in operating theatres, recovery wards or intensive care without its computer hardware needing to be modified.

In reference again to FIG. 2, it may be seen, moreover, that the front face of this trolley is occupied by different drawers 11: one of them, accessible by means of a security code, is designed for high security products such as narcotics, whereas the others are each equipped with a set or network of EDD means for the electronic, automatic and instantaneous detection of medications.

These EDD means, for example 30 per network, are distributed into a plurality of sub-sets or modules. They may contain an arbitrary number of EDD means determined for example to suit the size of the network to be formed, the dimensions of the drawer designed to contain them or other parameters. By way of example, an EDD means module may contain three means of this type made from three support blocks.

Figure 3:
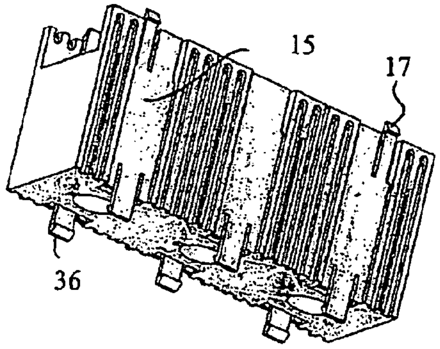
Figure 4:
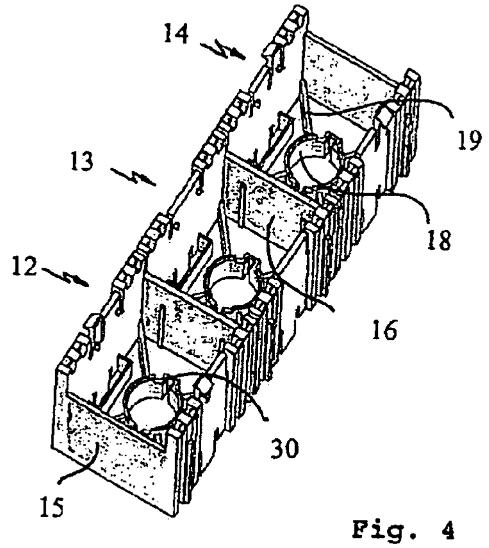

FIGS. 3 and 4 show such a set of three support blocks 12, 13, 14 configured in a modular support block. As may be seen, the three blocks in question are each defined by walls 15, parallel two by two whereas the adjacent walls of two adjoining blocks are merged with one another in walls 16.

Generally, this modular support block is obtained from a plastic material capable of providing very good rigidity to the set for example acrylonitrile butadiene styrene (ABS).

This modular support block is then juxtaposed next to other analogous blocks by means of their longitudinal walls, whose upper edges are equipped with hooks 17. These hooks act as supports for the attachment of the identification plates of the medications, featuring their descriptions or arbitrary colour codes for their description. This juxtaposition thus forms a series of modular support blocks. Several series of such series of modular blocks are thus created and positioned in juxtaposition to constitute the complete network.

In reference again to FIG. 4, it may be observed that in the modular block, the support blocks 12, 13, 14 are each completed by a tubular portion 18, parallel to the walls 15, centered in the volume inside of this block and attached by the rigid arms 19 to the walls in question.

Figure 7:
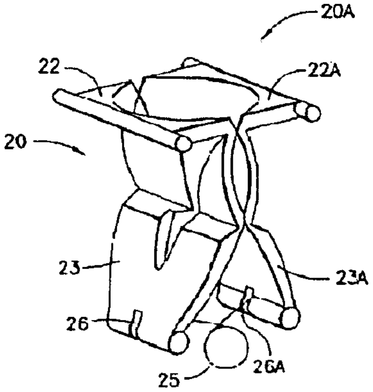
FIGS. 6 and 7 are representations in perspective of a spring system.
Figure 5:
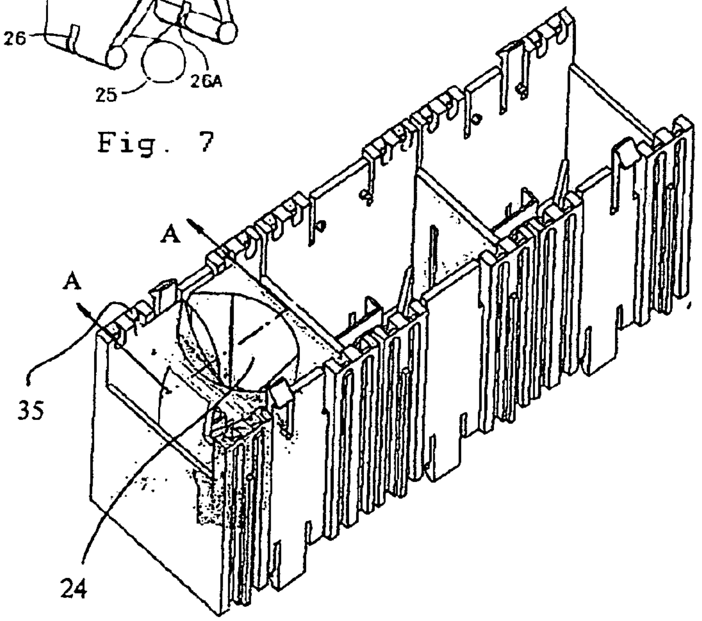
FIG. 5 is a representation in perspective of a modular support block equipped with a spring system.

As shown in FIG. 5, each support block contains a spring system of which one portion is equivalent to a housing designed to accommodate a medication. This spring system, visible in FIGS. 6 and 7, comprises two blades 20, 20A generally moulded from a plastic material, preferably polyoxymethylene (POM). These blades, respectively articulated in 21, 21A, form, at rest, an obtuse angle, wherein each of them comprises an upper wing respectively 22, 22A and a lower wing respectively 23, 23A. As may also be seen in FIGS. 5 to 7, the walls of the wings 20, 20A located opposite one another, each have a curve such that the union of these two curves forms a volume that is substantially conical equivalent to the housing 24 capable of accommodating an object such as a medication in single units. Generally, the dimensions of this housing are sufficient to accommodate this medication or a packaging of this medication with a width for example ranging from 9 mm to 25 mm.

Figure 6:
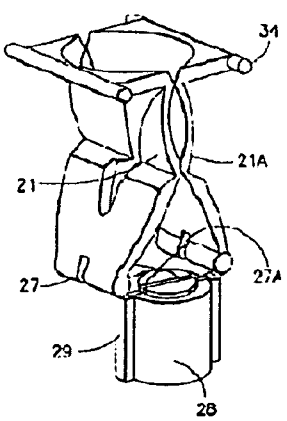

Furthermore, the lower wings 23, 23A are connected to one another by a wire 25 forming a spring whose ends 26, 26A are curved into hooks cooperating with the edges of these lower wings by means of orifices 27, 27A. This set-up is completed by a push button 28 for example made of ABS. This button, which is especially visible in FIG. 6, is attached to the spring 25 and has longitudinal protrusions 29 that are diametrically opposite one another and which cooperate, by sliding, with grooves 30 positioned longitudinally in the tubular portion 18.

Figure 9:
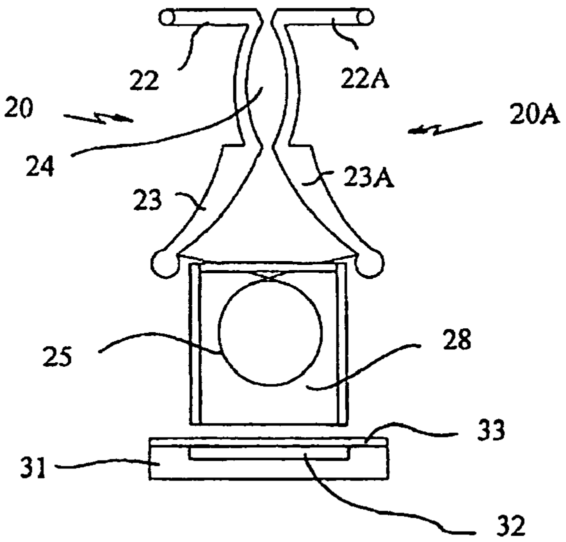
FIG. 9 is a diagrammatical representation of a front section A-A of a spring system and a pressure sensor support plate.

As shown diagrammatically in FIG. 9, the spring system thus elaborated overhangs a plate 31, for example made of stainless steel and with a thickness of approximately 2 mm. This plate provides support to a pressure sensor 32 positioned in the extension of the tubular portion 28. This pressure sensor is fixed, for example by gluing to the support plate, which is covered entirely by a film 33 approximately 1 mm thick of a protective material, for example silicone.

The resistance value of this sensor, during contact with a object, for example a medication, is around 1500Ω and more than 10 000Ω in the absence of a contact, which permits faultless detection of this object.

By referring again to FIG. 6, it may also be observed that the edges of the upper wings of the spring system extend, on either side, in four tenons 34 which are capable of fitting into the slots 35 made on the upper edges of two parallel walls of the support block.

Figure 8:
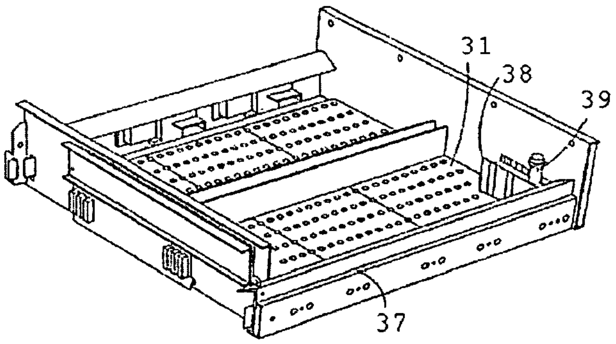
FIG. 8 is a representation in perspective of a drawer equipped with a pressure sensor support plate and a module formed by EDD means.

As also shown in FIG. 3, the lower edges of the modular block moreover have hooks 36. These hooks are designed to fit into the slots 37 in the plate 31, which can be seen in FIG. 8. This plate covers the entire base of the module 38 which, shown by way of example, comprises, introduced inside EDD means, a medication packaged in a vial 39.

Furthermore, it may be observed that each half of the bottom of the drawer shown is covered by three plates 31, wherein each of them supports a network, for example of 30 EDD means created from 10 modular blocks, such as that shown in 40 in FIG. 2.

The pressure sensors of the EDD means of this network are dependent on an electronic board (not shown) capable of carrying out the permanent scanning. It is composed input/output ports managed by a microcontroller and a communication port. In fact, this board carries out the scan in less than 0.5 seconds and with low electrical consumption (less than 50 mA), for example a scan of the 180 pressure sensors that may be fitted to the drawer of FIG. 8, which permits a response to be obtained virtually instantaneously when extracting an object, for example a medication from its housing or when such an object is re-introduced into a housing until it creates a contact with this sensor. Furthermore, a storage memory allows all of the contacts or liberations of contacts with the pressure sensor to be conserved, even in the event of a fault with the computer processing unit connected to it or a breakdown in communication with it.

In the light of the above, it may be understood that the introduction of a medication 39 into the housing 24, for example a vial of a solution that may be injected, causes the separation of the blades 20 and 20A attached to the support block by means of tenons 34 and slots 35. This separation creates a vertical force on the two ends of the spring 25 at the hooks 26 and 26A. Simultaneously, the spring passes on this force by a vertical force on the push button 28 on which it is fitted. This pressure, for example around 15 Newtons, is always constant and maximum given that this push button is retained by a stop point to avoid too excessive a pressure being exerted on the pressure sensor and thus risking it being weakened. The push button is then moved in the direction of the pressure sensor 32 until it comes into contact with it, which causes the emission of an electrical pulse translating this introduction movement and, consequently, the presence of this medication in the housing.

On the contrary, the withdrawal of a medication from its housing 24 causes the blades 20 and 20A, attached to the support block, to move towards one another, due to the liberation of the tension of the spring 25 and simultaneously that of the contact of the push button 28 with the pressure sensor 32. This push button moves away from this sensor causing the emission of an electrical pulse translating this withdrawal movement and, consequently, the absence of this medication in the housing. These electrical pulses, which constitute items of information on the movements of these objects, may be transmitted, to suit requirements, via an electronic board and a Wi-Fi network, to the central server 4 for use by suitable software, especially by accounting software.

The trolley previously described equipped with its different accessories, in particular the drawers fitted with EDD means also previously described, may be used in hospital environments in various ways, especially in a multiple patient recording mode or a single patient recording mode.

In the multiple patient recording mode, several patients are attributed to a trolley by means of an individual control button on the on board computer unit. This set-up may be used for example, for post-operation wards (recovery wards), intensive care units, etc.

When the trolley is initialized or every time that a patient is admitted, a member of the nursing staff records this in the trolley by scanning the identification bar code and by specifying the control button that is reserved to the person to signal this.

When a nurse has to take, from this trolley, a medication for the patient concerned, this nurse presses the control button reserved to this patient.

Once the drawer is open, following the identification of the nurse, the latter identifies the medication to be administered by means of its description or a colour code that has previously been attributed to it. This nurse then removes this medication from its housing located inside EDD means. This operation thus breaks the contact of the push button with the pressure sensor of this EDD means, which is translated by the immediate generation of an item of information as a result of the permanent scanning of the pressure sensors. This information is transmitted to the central server, received and processed especially by accounting software so that this medication may be invoiced to the patient concerned.

In the single patient recording mode, removing a medication from its housing of an EDD means automatically attributes the invoicing of this medication to this patient.

This set-up is used for example in operating theatres or intensive care wards.

Cabinet

Figure 10:
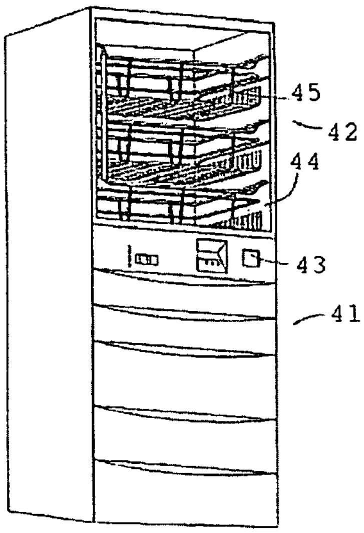
FIG. 10 is a representation of a cabinet designed to contain the EDD means.

The cabinet 2, which can be seen in FIG. 10, is divided into a lower section 41 and an upper section 42.

The lower section 40 comprises drawers 43 that are each equipped with networks that in total include, for example 180 EDD means preferably in the form of modules containing three means of this type as previously described.

As in the case of the trolley, these EDD means are designed to detect the presence of medications housed in the unit of their spring systems or on the contrary the absence of these medications.

This detection is carried out very rapidly, in a few milliseconds as a result of the permanent scanning of the pressure sensors by the electronic board, which manages it.

Each of these drawers is controlled by an independent electronic lock that requires, in order to be opened, the identification of a user for example by the reading of a bar code.

The lower section is also equipped with a bar code reader 44 for the direct identification of a user at cabinet level and also contains, in a drawer locked by key, all of the electronic management means of this cabinet.

As concerns the upper section 42 of the cabinet, it is equipped with shelves 45 for the storage of more voluminous medications than those in the lower section, wherein these medications have a bar code to permit, at the level of this cabinet, direct identification of a user.

The cabinet thus created permits the identification at any time of the state of the stock of medications that it disposes of and is ready to react when this stock reaches the pre-programmed critical values.

Terminal

Figure 11:
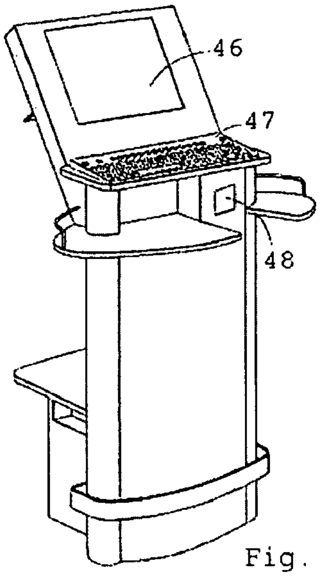
FIG. 11 is a representation of a terminal for the management of the cabinet of FIG. 10.

The above cabinet 2 is connected to a control terminal 3, shown in FIG. 11, especially equipped with a computer processing unit (not shown) a touch sensitive screen 46, a keyboard 47 and a bar code reader 48 for the identification of a user. By means of software, this terminal carries out different jobs automatically. Consequently, it permits the configuration of the drawers containing the EDD means to be loaded, the emission of alerts concerning the stocks of medications, the securing of the access to these drawers and more generally the access to all of the data and functions of the device of FIG. 1.

The device capable of implementing the method according to the invention is based, as previously described, on the automation of different hospital departments, especially the decentralized pharmacies, the operating theatres and recovery wards by means of specific hardware and complete management software.

This automation thus permits:

the stocks of medical or surgical products to be maintained at maximum levels. By way of example, when the stock of these products in a cabinet reaches a critical threshold, the device according to the invention automatically informs the central pharmacy of the hospital. Furthermore, the verification of the stock of this cabinet may be carried out remotely, the monitoring of all the movements of the medical or surgical products to be carried out, all medical or surgical products administered to a patient to be automatically invoiced. For example, when a medication is removed from the housing of an EDD means on board a trolley, after it has transmitted the identification of a patient to the computer unit of this trolley, this medication is automatically invoiced to this patient. On the contrary, this medication, if it is not administered to this patient but returned to an EDD means of this trolley, will be automatically credited to the account of said patient, to increase the security level for the handling of all medical or surgical products, to economize the time of the hospital staff, to secure the access to medications such as narcotics.

The preceding specific embodiments are illustrative of the practice of the invention. It is to be understood, however, that other expedients known to those skilled in the art or disclosed herein, may be employed without departing from the spirit of the invention or the scope of the appended claims.

The invention claimed is:

1. A method for the automated monitoring and management of objects, of such as medications in hospital environments comprising the steps of: providing a network of n individual housings (24) containing a set of n objects, transmitting to at least one of these objects, one or several movements during the extraction of said object from the housing or the reintroduction of the object into an empty housing among the n housings, providing a pressure sensor to automatically and instantaneously detect the movements of introducing an object into the empty housing or withdrawing an object from the housing, transmitting the movement information to a computer processing unit wherein this housing comprises: a spring system comprising two blades (20, 20A) attached to a support block (12), wherein:

a) during an introduction of an object into said housing, a transforming force separates the two blades perpendicular to the pressure sensor resulting in contact with the sensor, which sensor generates an item of movement information, b) during a withdrawal of an object from said housing, the two blades to move towards one another and consequently break a pre-established contact with the pressure sensor, which generates an item of movement information.

2. A method according to claim 1, wherein the object movement transmission step is preceded by the series of following steps consisting of:

creating and storing, in the memory of a computer processing unit (4), the data specific to a set of objects and/or individuals, providing a network of n individual housings (24) for the set of said objects, placing in the n housings one of said objects per housing so that the network contains a number equal to n objects, transmitting to the computer processing unit an item of memorized identification information of a memorized individual.

3. A method according to claim 1, wherein the movement detection step is followed by a transmission step, wherein the identification information detected in the movement detection step is transmitted to the computer processing unit which determines and adds to the memorized data of an individual respectively the addition or the withdrawal of the object.

4. A device for the implementation of the method according to claim 1, of the type comprising:

a network of n individual housings (24) capable of accommodating a set of n objects, wherein each housing is equipped with automatic detection means for the movements of the object initially placed in one of the n housings, wherein this detection means comprises a pressure sensor and these movements are chosen from the extractions of said objects from its housing and the reintroductions of this object into an empty housing among the n housings of the network, means for transforming this movement detection into an information identifying this movement which is a withdrawal or a reintroduction, as well as means capable of collecting this movement identification information and using it in a computer processing unit, whereby the movement detection means also comprises a spring system equipped with two blades capable of moving apart from one another when an object is introduced between them or moving towards one another when an object between them is withdrawn.

5. A device according to claim 4, comprising a central computer unit (4) for processing the memorized data wherein said computer processing unit comprises a memorized database which is specific to a set of n objects and/or individuals, and comprises a means for transmitting the movement identification information to the data processing unit and saving and memorizing it in the data base of objects and/or individuals.

6. A device according to claim 4, wherein the spring system comprises two symmetrical blades (20, 20A) comprising an upper wing (22, 22A) and a lower wing (23, 23A) articulated between one another and forming at rest an obtuse angle, wherein these blades are positioned back to back at their articulation (21, 21A), and wherein these upper wings are configured to form together a housing (24) for the object and the lower wings are connected to one other by a wire (25) forming a spring wherein the spring cooperates with a push button (28) for moving perpendicularly to the pressure sensor (32) until it comes into contact with it or is freed.

7. A device according to claim 4, wherein the spring system is attached to a support (12).

8. A device according to claim 4, wherein the pressure sensor is bound to a support plate and the support of the spring system is attached to the support plate such that the pressure sensor is positioned in the displacement axis of the push button.

9. A device according to claim 4, wherein the objects are medical products, including packaged medications (39), non-packaged medications, medical devices, medical appliances, surgical devices, or surgical appliances.

10. A device according to claim 4, comprising:

a central computer data processing unit (4) further comprising a memorized database specific to a set of n medical or surgical products and/or individuals, at least one interactive trolley (1) equipped with automatic means of detection for the movements of medical or surgical products distributed in networks located in one or several drawers (11) of the trolley, at least one storage cabinet (2) for medical or surgical products equipped with automatic detection means for the movements of medical or surgical products distributed in networks located in one or several drawers (43) of the cabinet, at least one interactive terminal (3) operating as a communication and control terminal to the central computer processing unit and cabinets.

* * * * *